United States Patent
Sasao et al.

(10) Patent No.: US 10,983,535 B2
(45) Date of Patent: Apr. 20, 2021

(54) SYSTEM AND METHOD FOR POSITIONING A MOVABLE OBJECT

(71) Applicant: SZ DJI TECHNOLOGY CO., LTD., Shenzhen (CN)

(72) Inventors: Yukiyoshi Sasao, Shenzhen (CN); Zongyao Qu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 145 days.

(21) Appl. No.: 16/267,337

(22) Filed: Feb. 4, 2019

(65) Prior Publication Data

US 2019/0179346 A1    Jun. 13, 2019

Related U.S. Application Data

(63) Continuation of application No. PCT/CN2016/093641, filed on Aug. 5, 2016.

(51) Int. Cl.
| | |
|---|---|
| *G05D 1/10* | (2006.01) |
| *G01S 5/00* | (2006.01) |
| *G06K 9/00* | (2006.01) |
| *G08G 5/00* | (2006.01) |
| *G01S 5/16* | (2006.01) |

(52) U.S. Cl.
CPC ............ *G05D 1/106* (2019.05); *G01S 5/0036* (2013.01); *G01S 5/16* (2013.01); *G05D 1/102* (2013.01); *G06K 9/00637* (2013.01); *G08G 5/0013* (2013.01); *G08G 5/0021* (2013.01); *G08G 5/0052* (2013.01); *G08G 5/0069* (2013.01)

(58) Field of Classification Search
CPC ...... G05D 1/106; G05D 1/102; G08G 5/0052; G08G 5/0013; G08G 5/0021; G08G 5/0069; G01S 5/16; G01S 5/0036; G06K 9/00637
See application file for complete search history.

(56) References Cited

U.S. PATENT DOCUMENTS

| | | | | |
|---|---|---|---|---|
| 5,548,296 A | * | 8/1996 | Matsuno | G01S 5/02 |
| | | | | 342/418 |
| 5,587,937 A | * | 12/1996 | Massie | B25J 9/1689 |
| | | | | 700/264 |
| 6,067,077 A | * | 5/2000 | Martin | A63F 13/06 |
| | | | | 345/161 |
| 6,741,364 B2 | * | 5/2004 | Lange | G01B 11/00 |
| | | | | 356/139.03 |

(Continued)

FOREIGN PATENT DOCUMENTS

| | | | | | |
|---|---|---|---|---|---|
| CN | | 1530635 A | * | 9/2004 | ............ G01C 21/30 |
| CN | | 102007366 A | * | 4/2011 | ............ G01B 7/003 |

(Continued)

OTHER PUBLICATIONS

The World Intellectual Property Organization (WIPO) International Search Report and Written Opinion for PCT/CN2016/093641 dated May 10, 2017 8 pages.

*Primary Examiner* — Behrang Badii
*Assistant Examiner* — Jalal C Coduroglu
(74) *Attorney, Agent, or Firm* — Anova Law Group, PLLC

(57) ABSTRACT

A system for navigation includes a movable object. The movable object is configured to navigate to a first position and, while at the first position, determine a second position based on a selected point on an image.

19 Claims, 12 Drawing Sheets

(56) References Cited

U.S. PATENT DOCUMENTS

| | | | | |
|---|---|---|---|---|
| 6,822,648 B2* | 11/2004 | Furlong | G06T 15/40 | 345/421 |
| 6,905,091 B2* | 6/2005 | Berson | G05D 1/106 | 244/1 N |
| 6,915,205 B2* | 7/2005 | Kim | G01C 21/30 | 342/357.32 |
| 7,215,430 B2* | 5/2007 | Kacyra | G01B 11/002 | 345/427 |
| 7,352,149 B2* | 4/2008 | Butler | H02P 5/46 | 310/12.06 |
| 7,509,212 B2* | 3/2009 | Bodin | G01C 21/005 | 244/190 |
| 7,542,834 B2* | 6/2009 | Nobori | B60R 1/00 | 340/435 |
| 7,565,029 B2* | 7/2009 | Zhou | G06T 7/80 | 382/154 |
| 7,634,155 B2* | 12/2009 | Pawelski | E02F 3/435 | 382/151 |
| 7,795,861 B2* | 9/2010 | Englert | G01B 7/003 | 324/207.17 |
| 7,889,193 B2* | 2/2011 | Platonov | G06T 19/006 | 345/419 |
| 8,351,408 B2* | 1/2013 | Daigle | H04W 12/08 | 370/338 |
| 8,433,157 B2* | 4/2013 | Nijim | G06T 7/55 | 382/285 |
| 8,798,922 B2* | 8/2014 | Tillotson | G08G 5/0052 | 701/469 |
| 8,805,645 B2* | 8/2014 | Giesekus | G01S 1/70 | 702/152 |
| 8,843,248 B1* | 9/2014 | Dunn | G08G 5/0021 | 701/3 |
| 8,868,236 B2* | 10/2014 | Brogardh | B25J 9/1692 | 700/254 |
| 8,965,677 B2* | 2/2015 | Breed | G08G 1/163 | 701/301 |
| 9,132,913 B1* | 9/2015 | Shapiro | G08G 5/0086 | |
| 9,216,347 B2* | 12/2015 | Mutschler | G06F 3/011 | |
| 9,317,036 B2* | 4/2016 | Wang | G05D 1/0214 | |
| 9,529,429 B2* | 12/2016 | Saint-Requier | G06F 3/013 | |
| 10,419,690 B2* | 9/2019 | Wang | H04N 5/265 | |
| 2012/0026034 A1* | 2/2012 | Shiomi | G01S 19/42 | 342/357.25 |
| 2014/0316616 A1* | 10/2014 | Kugelmass | G06T 11/206 | 701/8 |
| 2015/0339931 A1* | 11/2015 | Yu | B64D 47/08 | 701/122 |
| 2016/0048132 A1* | 2/2016 | Cherepinsky | G08G 5/0069 | 701/4 |
| 2018/0055404 A1* | 3/2018 | Hashimshony | G16H 40/63 | |
| 2018/0203467 A1* | 7/2018 | Zhou | G06T 7/20 | |
| 2018/0284293 A1* | 10/2018 | Pan | G01S 19/43 | |
| 2018/0292526 A1* | 10/2018 | Papadelis | G01S 7/295 | |
| 2019/0034693 A1* | 1/2019 | Zang | G06T 7/11 | |
| 2019/0064794 A1* | 2/2019 | Chen | B64C 39/024 | |
| 2019/0082088 A1* | 3/2019 | Zhao | G05D 1/0094 | |
| 2019/0084675 A1* | 3/2019 | Qu | G05D 1/0094 | |
| 2019/0096080 A1* | 3/2019 | Liu | G06T 7/74 | |
| 2019/0106210 A1* | 4/2019 | Qu | B64C 27/52 | |
| 2019/0121156 A1* | 4/2019 | Yu | G02B 7/102 | |
| 2019/0179344 A1* | 6/2019 | Qu | G01M 1/12 | |
| 2019/0241263 A1* | 8/2019 | Gu | H04N 5/225 | |
| 2020/0064133 A1* | 2/2020 | Chen | G06T 7/00 | |

FOREIGN PATENT DOCUMENTS

| | | | | |
|---|---|---|---|---|
| CN | 103941748 A | | 7/2014 | |
| CN | 104024984 A | * | 9/2014 | A63F 13/65 |
| CN | 105676865 A | | 6/2016 | |
| CN | 108291970 A | * | 7/2018 | G01S 17/46 |
| CN | 108351649 A | * | 7/2018 | G05D 1/0094 |
| CN | 108521787 A | * | 9/2018 | G01C 21/3632 |
| FR | 3049067 A1 | * | 9/2017 | G01S 11/02 |
| JP | 2006143193 A | | 6/2006 | |
| JP | 2008186145 A | | 8/2008 | |
| JP | 4253239 B2 | | 4/2009 | |
| JP | 2009294067 A | | 12/2009 | |
| JP | 2012071645 A | | 4/2012 | |
| JP | 2012140101 A | | 7/2012 | |
| JP | 2014044067 A | | 3/2014 | |
| JP | 2014062789 A | | 4/2014 | |
| JP | 2014089160 A | | 5/2014 | |
| JP | 2017224265 A | * | 12/2017 | |
| JP | 2018027742 A | * | 2/2018 | |
| JP | 2018039420 A | * | 3/2018 | |
| WO | WO-2018032415 A1 | * | 2/2018 | G05D 1/0094 |
| WO | WO-2018073878 A1 | * | 4/2018 | G01C 11/00 |
| WO | WO-2018091649 A1 | * | 5/2018 | G01S 17/89 |
| WO | WO-2018193574 A1 | * | 10/2018 | G08G 5/00 |

* cited by examiner

SYSTEM AND METHOD FOR POSITIONING A MOVABLE OBJECT

CROSS-REFERENCE TO RELATED APPLICATION

This application is a continuation of International Application No. PCT/CN2016/093641, filed on Aug. 5, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to positioning and control of movable objects. More specifically, this disclosure relates to systems and methods for controlling the movement of movable objects.

BACKGROUND

Unmanned aerial vehicles ("UAV"), sometimes referred to as "drones," include pilotless aircraft of various sizes and configurations that can be remotely operated by a user and/or programmed for automated flight. UAVs can be used for many purposes and are often used in a wide variety of personal, commercial, and tactical applications. In many applications, UAVs can also be equipped with secondary devices to perform various tasks. For instance, UAVs equipped with imaging equipment, such as cameras, video cameras, etc., can capture images or video footage that is difficult, impractical, or simply impossible to capture otherwise. UAVs equipped with imaging devices find particular use in the surveillance, national defense, and professional videography industries, among others, and are also popular with hobbyists and for recreational purposes.

Precise navigation can be difficult with UAVs given the inherent inaccuracy of global navigation satellite systems ("GNSS"). In some cases, a UAV may use image recognition to help guide it through terrain. However, for surfaces that have poor contrast or do not include features, this can be difficult. The UAV may also use publicly available maps to determine waypoints, but these maps generally have low resolution, leading to inaccurate guidance and location determination. Therefore, systems and methods are needed to accurately determine waypoints for a UAV and navigate the UAV between waypoints.

SUMMARY

Certain embodiments of the present disclosure relate to a method for a movable object. The movable object may navigate to a first position and observe a surrounding. The movable object may identify a second position in the surrounding and calculate a relative position of the second position.

Certain embodiments of the present disclosure relate to system for navigation. The system may include a movable object. The movable object may initially be at a first position. The movable object may be further configured to determine a second position based on a selected point on an image.

Certain embodiments of the present disclosure relate to a method of a movable object. One or more predetermined coordinates selected from a map may be received by the movable object. The movable object may navigate to a first of the one or more predetermined coordinates. The movable object may observe a surrounding, where the surrounding may include at least one of the one or more predetermined coordinates. The movable object may receive coordinates indicating a point in the surrounding and determine a first vector from a base station to the first of the one or more predetermined coordinates. The movable object may further determine a second vector from the first of the one or more predetermined coordinates to the coordinates indicating the point in the surrounding and navigate from the first of the one or more predetermined coordinates to the coordinates based on a resultant vector of the first and second vectors.

Certain embodiments of the present disclosure relate to method of a movable object. The movable object may take an image and transmit the image to a remote control. The movable object may also receive, from the remote control, two-dimensional coordinates of two or more selected points on the image. The movable object may calculate a virtual wall based on the two-dimensional coordinates of the two or more selected points on the image. The movable object may be configured to not cross the virtual wall.

Certain embodiments of the present disclosure relate to a system for restricting the movement. The system may include a movable object. The movable object may be configured to take an image of a surface and determine a first position of a first point on the image and a second position of a second point on the image, and the movable object is further configured to not cross a virtual fence determined by the first and second positions.

Certain embodiments of the present disclosure relate to a method of selecting waypoints. An image taken from a movable object may be received and displayed the image to a user. A selection of at least one point on the image may be received and the image coordinates of the selected point may be determined. The coordinates may be transmitted to the movable object.

Certain embodiments of the present disclosure relate to a non-transitory computer-readable medium storing instructions that, when executed, cause a movable object to perform a method. The movable object may navigate to a first position and observe a surrounding. The movable object may identify a second position in the surrounding and calculate a relative position of the second position from the first position.

Certain embodiments of the present disclosure relate to a non-transitory computer-readable medium storing instructions that, when executed, cause a computing device to perform a method. One or more predetermined coordinates selected from a map may be received by the movable object. The movable object may navigate to a first of the one or more predetermined coordinates. The movable object may observe a surrounding, where the surrounding may include at least one of the one or more predetermined coordinates. The movable object may receive coordinates indicating a point in the surrounding and determine a first vector from a base station to the first of the one or more predetermined coordinates. The movable object may further determine a second vector from the first of the one or more predetermined coordinates to the coordinates indicating the point in the surrounding and navigate from the first of the one or more predetermined coordinates to the coordinates based on a resultant vector of the first and second vectors.

Certain embodiments of the present disclosure relate to a non-transitory computer-readable medium storing instructions that, when executed, cause a movable object to perform a method. The movable object may take an image and transmit the image to a remote control. The movable object may also receive, from the remote control, two-dimensional coordinates of two or more selected points on the image. The movable object may calculate a virtual wall based on the two-dimensional coordinates of the two or more selected points on the image. The movable object may be configured to not cross the virtual wall.

Certain embodiments of the present disclosure relate to a non-transitory computer-readable medium storing instructions that, when executed, cause a device to perform a method of selecting waypoints. An image taken from a movable object may be received and displayed the image to a user. A selection of at least one point on the image may be received and the image coordinates of the selected point may be determined. The coordinates may be transmitted to the movable object.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

Figure 1:
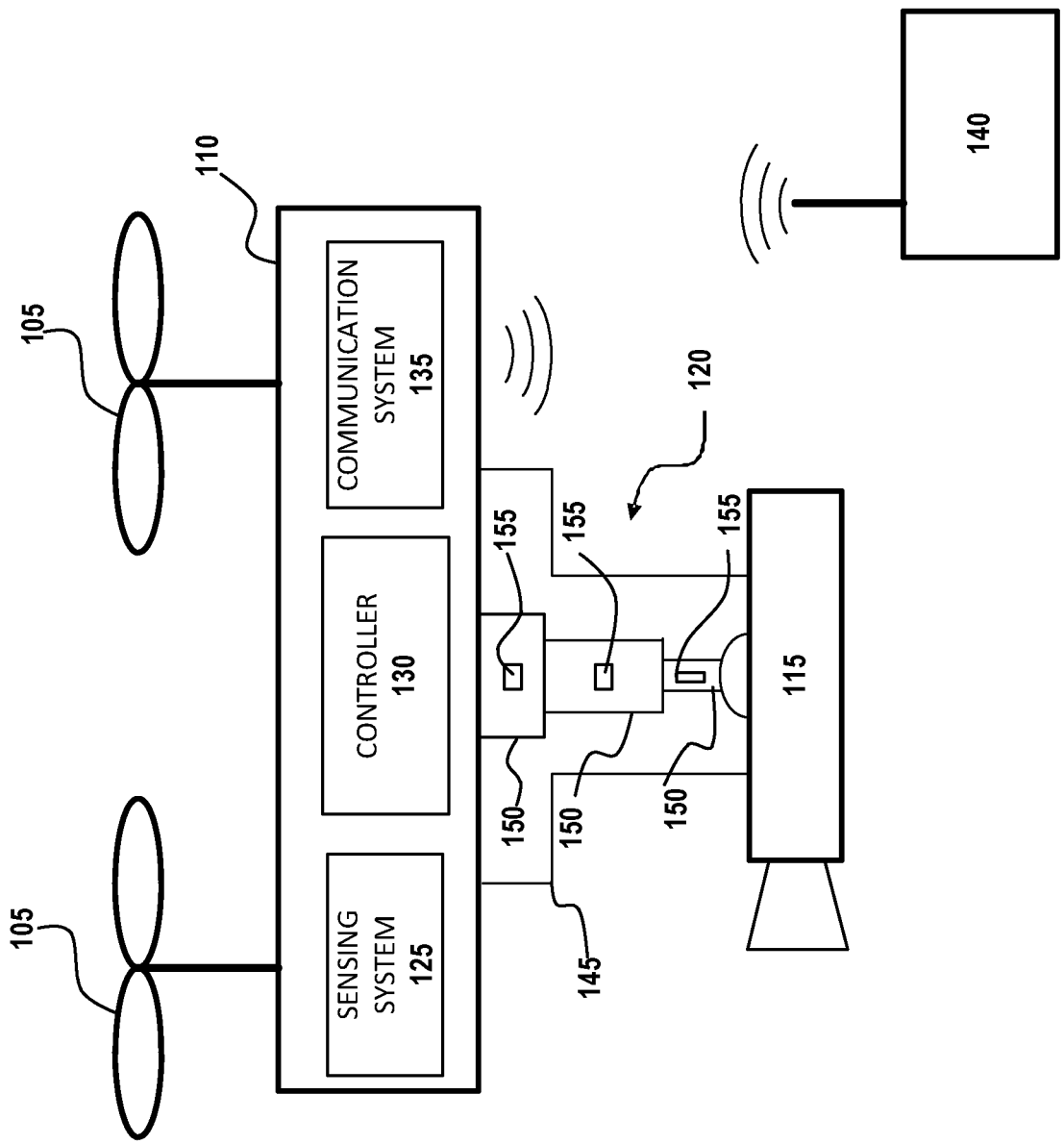
FIG. 1 illustrates an exemplary movable object with a carrier, a payload, and a control terminal, consistent with the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

As used in this application and in the claims, moving parameters may include moving path parameters, in that it describes the parameters used to alter a trajectory and movement of a movable object. Moving path may include flight path, in that it describes a trajectory and movement of a movable object.

The systems and methods described herein should not be construed as limiting in any way. Instead, the present disclosure is directed toward all novel and non-obvious features and aspects of the various disclosed embodiments, alone and in various combinations and sub-combinations with one another. The disclosed systems and methods are not limited to any specific aspect or feature or combinations thereof, nor do the disclosed systems and methods require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Systems and methods consistent with the present disclosure are directed to precise navigation of a movable object, where the movable object observes its surroundings in real time (e.g., while the movable object is navigating), identifies a point in the surroundings to navigate to, calculates a position of the point, and then navigates to the point. In some embodiments, the movable object may be unmanned aerial vehicles. In other embodiments, the movable object may be automobiles, boats, radio controlled vehicles, robots, etc. The movable object may navigate to a first position. The first position may be predetermined, or a user using a remote control terminal ("terminal") may direct the moveable object to the first position. The movable object or terminal may determine waypoints (e.g., points to which the movable object navigates) in observed surroundings. In some embodiments, the movable object may take an image of the surroundings and send the image to the terminal. The image may be displayed to a user on a screen with which the user can select a waypoint on the image. In some embodiments, two-dimensional coordinates of the waypoint may be transmitted to the movable object, where they are translated into three-dimensional coordinates. In other embodiments, the two-dimensional coordinates may be translated in the terminal into three-dimensional coordinates. The movable object may use RTK to determine its relative position from a base station and its relative position from the three-dimensional coordinates of the waypoint. The relative positions may be indicated as vectors. The movable object may then use the vectors to determine the relative position of the waypoint from the base station. In some examples, the relative position of the waypoint may be determined by adding the two previously determined vectors.

Systems and methods consistent with the present disclosure are further directed to determining a "no-enter" zone for a movable object or, in the example of a UAV, a "no-fly" zone. In the example of a UAV, the no-fly area may be determined from at least two spatial coordinates. For example, a line may be drawn between two coordinates to form a virtual wall. The virtual wall may extend along the ground between the two spatial coordinates, and extend upward to a predetermined altitude. In some embodiments, the movable object may take the image and the virtual wall may be formed between points selected on the image. The movable object may transmit the image to a terminal, where it may be displayed for a user to select such points on the image. In some embodiments, two-dimensional coordinates of the selected points may be transmitted to the movable object, where the movable object may translate the two-dimensional coordinates into three-dimensional coordinates relative to the movable object. In other embodiments, the terminal may translate the two-dimensional coordinates into three-dimensional coordinates using additional positional information received from the movable object. As described above, the movable object may determine the position, relative to the base station, of the selected points forming the virtual wall by using a summation of vectors.

FIG. 1 shows an exemplary movable object 100 that may move or travel within an environment (e.g., surroundings). Movable object 100 may be any suitable object, device, mechanism, system, or machine configured to travel on or within a suitable medium (e.g., a surface, air, water, rails, space, underground, etc.). For example, movable object 100 may be an unmanned aerial vehicle. Although movable object 100 is shown and described herein as a UAV for exemplary purposes of this description, it is understood that other types of movable objects 100 (e.g., wheeled objects, nautical objects, locomotive objects, other aerial objects, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

As shown in FIG. 1, movable object 100 may include one or more propulsion devices 105 connected to main body 110 and may be configured to carry a payload 115. In some embodiments, payload 115 may be connected or attached to movable object 100 by a carrier 120, which may allow for one or more degrees of relative movement between payload 115 and main body 110. In other embodiments, payload 115 may be mounted directly to main body 110 without carrier 120. Movable object 100 may also include a sensing system 125, a controller 130 in communication with the other components, and a communication system 135.

Movable object 100 may include one or more (e.g., 1, 2, 3, 3, 4, 5, 10, 15, 20, etc.) propulsion devices 105 positioned at various locations (e.g., top, sides, front, rear, and/or bottom of main body 110) for propelling and steering movable object 100. Propulsion devices 105 may be devices or systems operable to generate forces for sustaining controlled flight. Propulsion devices 105 may share or may each separately include or be operatively connected to a power source (not shown), such as a motor (e.g., an electric motor, hydraulic motor, pneumatic motor, etc.), an engine (e.g., an internal combustion engine, a turbine engine, etc.), a battery bank, etc., or combinations thereof. In some examples, propulsion devices 105 may also include one or more rotary components (e.g., include rotors, propellers, blades, nozzles, etc.) drivably connected to the power source and configured to participate in the generation of forces for sustaining controlled flight. Rotary components may be driven on or by a shaft, axle, wheel, hydraulic system, pneumatic system, or other component or system configured to transfer power from the power source. Propulsion devices 105 and/or rotary components may be adjustable (e.g., tiltable) with respect to each other and/or with respect to main body 110. Alternatively, propulsion devices 105 and the rotary components may have a fixed orientation with respect to each other and/or main body 110. In some embodiments, each propulsion device 105 may be of the same type. In other embodiments, propulsion devices 105 may be of different types. In some embodiments, all propulsion devices 105 may be controlled in concert (e.g., all at the same speed and/or angle). In other embodiments, one or more propulsion devices may be independently controlled with respect to, e.g., speed and/or angle.

Propulsion devices 105 may be configured to propel movable object 100 in one or more vertical and horizontal directions and to allow movable object 100 to rotate about one or more axes. That is, propulsion devices 105 may be configured to provide lift and/or thrust for creating and maintaining translational and rotational movements of movable object 100. For instance, propulsion devices 105 may be configured to enable movable object 100 to achieve and maintain desired altitudes, provide thrust for movement in all directions, and provide for steering of movable object 100. In some embodiments, propulsion devices 105 may enable movable object 100 to perform vertical takeoffs and landings (i.e., takeoff and landing without horizontal thrust). In other embodiments, movable object 100 may require constant minimum horizontal thrust to achieve and sustain flight. Propulsion devices 105 may be configured to enable movement of movable object 100 along and/or about multiple axes, as described below.

Payload 115 may include one or more sensory devices, which may include devices for collecting or generating data or information, such as surveying, tracking, and capturing images or video of targets (e.g., objects, landscapes, subjects of photo or video shoots, etc.). Payload 115 may include imaging devices configured to generate images. For example, imaging devices may include photographic cameras, video cameras, infrared imaging devices, ultraviolet imaging devices, x-ray devices, ultrasonic imaging devices, radar devices, etc. Payload 115 may also, or alternatively, include devices or capturing audio data, such as microphones or ultrasound detectors. Payload 115 may also or alternatively include other suitable sensors for capturing visual, audio, and/or electromagnetic signals.

Carrier 120 may include one or more devices configured to hold the payload 115 and/or allow the payload 115 to be adjusted (e.g., rotated) with respect to main body 110. For example, carrier 120 may be a gimbal. Carrier 120 may be configured to allow payload 115 to be rotated about one or more axes, as described below. In some embodiments, carrier 120 may be configured to allow 360° of rotation about each axis to allow for greater control of the perspective of the payload 115. In other embodiments, carrier 120 may limit the range of rotation of payload 115 to less than 360° (e.g., ≤270°, ≤210°, ≤180°, ≤120°, ≤90°, ≤45°, ≤30°, ≤15°, etc.), about one or more of its axes.

Carrier 120 may include a frame assembly 145, one or more actuator members 150, and one or more carrier sensors 155. Frame assembly 145 may be configured to couple the payload 115 to the main body 110 and, in some embodiments, allow payload 115 to move with respect to main body 110. In some embodiments, frame assembly 145 may include one or more sub-frames or components movable with respect to each other. Actuator members 150 may be configured to drive components of frame assembly relative to each other to provide translational and/or rotational motion of payload 115 with respect to main body 110. In other embodiments, actuator members 150 may be configured to directly act on payload 115 to cause motion of payload 115 with respect to frame assembly 145 and main body 110. Actuator members 150 may include electric motors configured to provide linear or rotational motion to components of frame assembly 145 and/or payload 115 in conjunction with axles, shafts, rails, belts, chains, gears, and/or other components.

Carrier sensors 155 may include devices configured to measure, sense, detect, or determine state information of carrier 120 and/or payload 115. State information may include positional information (e.g., relative location, orientation, attitude, linear displacement, angular displacement, etc.), velocity information (e.g., linear velocity, angular velocity, etc.), acceleration information (e.g., linear acceleration, angular acceleration, etc.), and or other information relating to movement control of carrier 120 or payload 115 with respect to main body 110. Carrier sensors 155 may include one or more types of suitable sensors, such as potentiometers, optical sensors, visions sensors, magnetic sensors, motion or rotation sensors (e.g., gyroscopes, accelerometers, inertial sensors, etc.). Carrier sensors 155 may be associated with or attached to various components of carrier 120, such as components of frame assembly 145, actuator members 150, or main body 110. Carrier sensors 155 may be configured to communicate data to and/or receive data from controller 130 via a wired or wireless connection (e.g., RFID, Bluetooth, Wi-Fi, radio, cellular, etc.). Data generated by carrier sensors 155 and communicated to controller 130 may be further processed by controller 130. For example, controller 130 may determine state information of movable object 100 and/or targets.

Carrier 120 may be coupled to main body 110 via one or more damping elements configured to reduce or eliminate undesired shock or other force transmissions to payload 115 from main body 110. Damping elements may be active, passive, or hybrid (i.e., having active and passive characteristics). Damping elements may be formed of any suitable material or combinations of materials, including solids, liquids, and gases. Compressible or deformable materials, such as rubber, springs, gels, foams, and/or other materials may be used as damping elements. The damping elements may function to isolate and/or dissipate force propagations from main body 110 to payload 115. Damping elements may also include mechanisms or devices configured to provide damping effects, such as pistons, springs, hydraulics, pneumatics, dashpots, shock absorbers, and/or other devices or combinations thereof.

Sensing system 125 may include one or more sensors associated with one or more components or other systems of movable device 100. For example, sensing system may include sensors for determining positional information, velocity information, and acceleration information relating to movable object 100 and/or targets. In some embodiments, sensing system 125 may also include carrier sensors 155. Components of sensing system 125 may be configured to generate data that may be used (e.g., processed by controller 130 or another device) to determine additional information about movable object 100, its components, or its targets. Sensing system 125 may include one or more sensors for sensing one or more aspects of movement of movable object 100. For example, sensing system 125 may include sensory devices associated with payload 115 as discussed above and/or additional sensory devices, such as a receiver for a positioning system (e.g., GNSS, including GPS, GLONASS, Galileo, BeiDou, GAGAN; RTK; etc.), motion sensors, inertial sensors (e.g., IMU sensors), proximity sensors, image sensors, altitude sensors (e.g., barometer, laser range finder, etc.), attitude sensors (e.g., accelerometers, gyros, or the like), etc. Sensing system 125 may also include sensors or be configured to provide data or information relating to the surrounding environment, such as weather information (e.g., temperature, pressure, humidity, etc.), lighting conditions, air constituents, or nearby obstacles (e.g., objects, structures, people, other vehicles, etc.).

Controller 130 may be configured to receive inputs (e.g., from sensing system 125 and/or communication system 135) and produce outputs (e.g., to control propulsion devices 105, payload 115, etc., or to provide data to sensing system 125, communication system 135, etc. Controller 130 may include a computing device, such as a processor, and memory. The memory may store instructions to configure modules to be executed by the processor. Controller 130 may also comprise hardware, such as application specific integrated circuits, etc., to perform process inputs and generate outputs. Controller 130 is described in more detail with reference to FIG. 3, below.

Communication system 135 may be configured to enable communications of data, information, commands, and/or other types of signals between controller 130 and off-board entities (e.g., terminals). Communication system 135 may also be configured to receive timing information, such as from a global timing system (e.g., GNSS, atomic clock, terminal 140, etc.). Communication system 135 may include one or more components configured to send and/or receive signals, such as receivers, transmitter, or transceivers that are configured to carry out one- or two-way communication. Components of communication system 135 may be configured to communicate with off-board entities via one or more communication networks, such as radio, cellular, Bluetooth, Wi-Fi, RFID, etc. For example, communication system 135 may be configured to enable communications between devices for providing input for controlling movable object 100 during flight, such as a remote control terminal 140.

Terminal 140 may be configured to receive input, such as input from a user (user input), and communicate signals indicative of the input to controller 130. Terminal 140 may be configured to receive input and generate corresponding signals indicative of one or more types of information, such as control data (e.g., signals) for moving or manipulating movable device 100 (e.g., via propulsion devices 105), payload 115, and/or carrier 120. Terminal 140 may also be configured to receive data from movable object 100, such as operational data relating to positional data, velocity data, acceleration data, altitude data, attitude data, sensory data, and/or other data relating to components and/or the surrounding environment. In some embodiments, terminal 140 may be a remote control with physical sticks configured to control moving parameters, or a touch screen device, such as a smartphone or a tablet, with virtual controls for the same purposes, or an application on a smartphone or a table, or a combination thereof. In other embodiments, terminal 140 display data received from movable object 100 (e.g., image taken from a camera). In some embodiments, Terminal 140 may be configured to send coordinate data to movable object 100 based on selections by a user. Terminal 140 may communicate data to a user or other remote system, and receive data from a user or other remote system.

Figure 2:
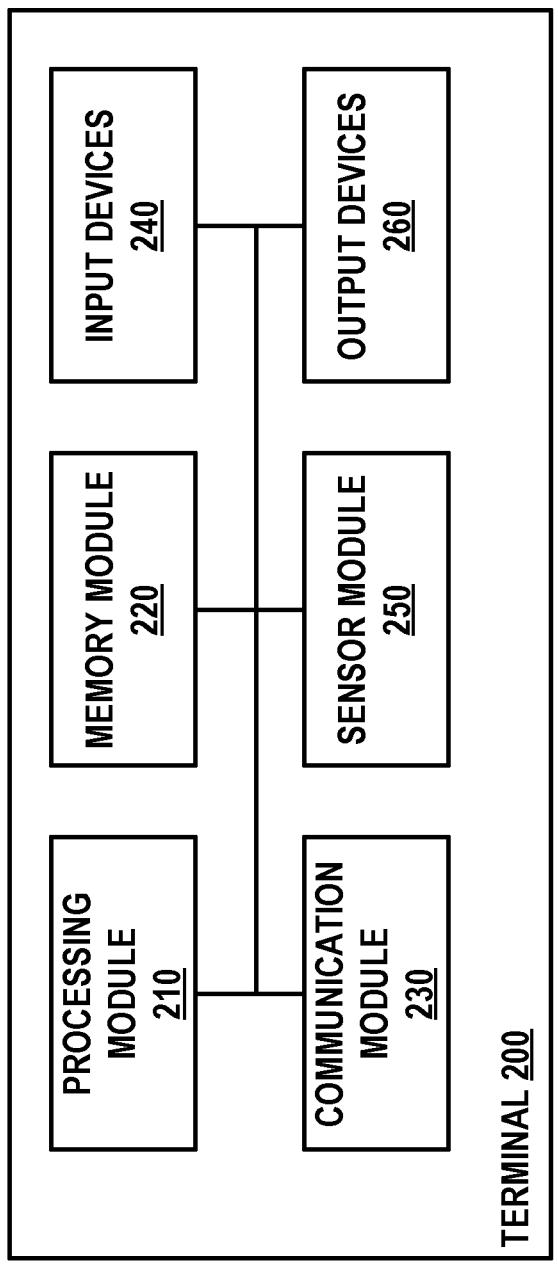
FIG. 2 illustrates an example control terminal that may be used with embodiments consistent with the present disclosure.

FIG. 2 illustrates an exemplary remote control terminal (e.g., remote computing device) 200 that may be used with embodiments consistent with the present disclosure. Terminal 200 may be an electronic device, such as a cellular phone, a tablet, a personal digital assistant, a laptop computer, or other device; or a control station installed inside a control tower or building. As shown in FIG. 2, terminal 200 may include processing module 210, memory module 220, communication module 230, input devices 240, and output devices 250.

Processing module 210 may execute computer-executable instructions stored in software and may be a real or a virtual processor device. In a multi-processing system, multiple processing units execute computer-executable instructions to increase processing power.

Memory module 220 may be volatile memory (e.g., registers, cache, RAM), non-volatile memory (e.g., ROM, EEPROM, flash memory, etc.), or some combination of the two. The memory may store software implementing computer applications (e.g., apps) for terminal 200. For example, the memory may store an operating system, software implementing transmission of positional data from the terminal 200 to a remote device, such as movable object 100. Typically, operating system software provides an operating environment for other software executing in the computing environment, and coordinates activities of the components of the computing environment. Memory module 220 may be removable from terminal 200.

Communication module 230 may facilitate communication of information between terminal 200 and other entities, such as movable object 100. Communication module 230 may include antennae or other devices configured to send or receive signals. Terminal 200 may also include one or more input devices 240 configured to receive input (e.g., from a user and/or sensors module 250 included or connected to terminal 200) for communication to movable object 100. It is understood, however, that other possible embodiments or layouts of terminal may be possible and are within the scope of this disclosure.

In some embodiments, terminal 200 may have a plurality of input devices 240 configured to receive user inputs indicative of desired movements of movable object 100 or its components. In some examples, terminal 200 may include input devices 240, such as input levers, buttons, triggers, etc. Input devices 240 may be configured to generate a signal to communicate to movable object 100 using communication module 230. In addition to movement control inputs, input devices 240 may be used to receive other information, such as manual control settings, automated control settings, control assistance settings. In some embodiments, input devices 240 may be touch sensitive, such as a touch screen. In some examples, input devices 240 may allow a user to input coordinates on a map or image by selecting points on the map or image.

In some embodiments, terminal 200 may also include output devices 260 configured to display and/or receive information to and/or from a user. For example, terminal 200 may be configured to receive signals from a remove device, which signals may be indicative of data relating to movements of the device and/or data (e.g., imaging data) acquired by the device. In some embodiments, output devices 260 may be a multifunctional display device configured to display information on a multifunctional screen as well as receive user input via the multifunctional screen (e.g., touch input). In another embodiment, a multifunctional screen may constitute a sole input device for receiving user input.

In some embodiments, terminal 200 may be or include an interactive graphical interface for receiving one or more user inputs. Graphical versions of terminal 200 and/or input devices 240 may be displayable on output devices 260 and include graphical features (e.g., graphical buttons, text boxes, dropdown menus, interactive images, etc.). For example, in one embodiment, terminal 200 may include graphical representations of input levers, buttons, and triggers, which may be displayed on and configured to receive user input via a multifunctional screen. In some embodiments, terminal 200 may be configured to generate graphical versions of input devices 240 in conjunction with an app to provide an interactive interface on the display device or multifunctional screen of any suitable electronic device (e.g., a cellular phone, a tablet, etc.) for receiving user inputs.

In some embodiments, output devices 260 may be an integral component of terminal 200. In other embodiments, output devices 260 may be connectable to (and dis-connectable from) terminal 200.

Figure 3:
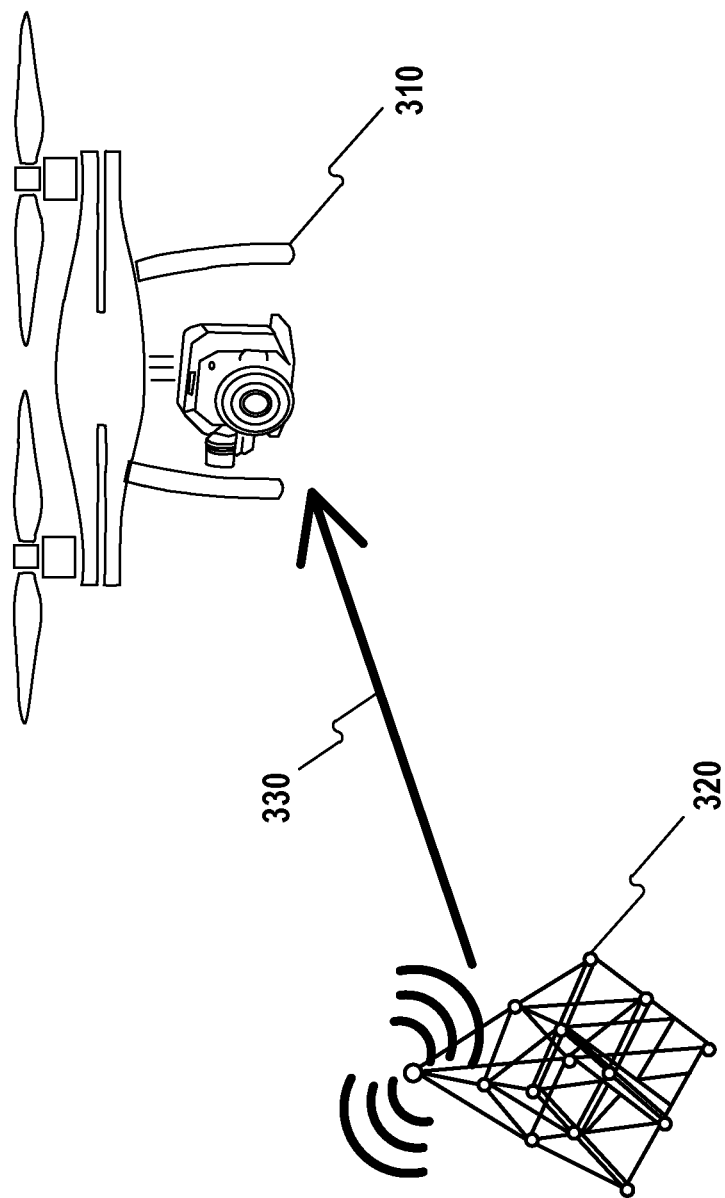
FIG. 3 illustrates an exemplary environment with a movable object and a base station, consistent with the present disclosure.

FIG. 3 illustrates an exemplary environment 300 with a movable object 310 and a base station 320. In some embodiments, movable object 310 may be equipped with a GNSS module to determine its position at any given time. It is known, however, that the accuracy of a GNSS module is limited and may provide position accuracy on the order of meters. In some embodiments, base station 320 may also be equipped with a GNSS module to determine its position. Further, in some examples, the absolute position of the base station 320 may be known. For example, highly accurate mapping techniques may be used to determine the absolute position of the base station 320.

RTK may be used to accurately and precisely determine the absolute position of movable object 310 using the GNSS modules in the base station 320 and movable object 310. In general, RTK is a differential GNSS technique, which allows accurate position determination near a base station (e.g., within 10 to 20 kilometers from the base station). RTK uses phase measurements of GNSS carrier waves, ambiguity resolution, and differential correction to provide centimeter-level accuracy in determining the position of movable object 310. Because the absolute position of base station 320 may be known, the absolute position of movable object 310 may be known to a high accuracy (e.g., sub-meter, or within centimeters).

RTK navigation is particularly useful in situations requiring the UAV to fly very precisely. For example, a movable object may be required to spray agrichemicals on farm land, where it must stay within the borders of the land so that the chemicals are not sprayed on another's land outside of the border. In another example, a movable object may approach to within a few meters of the walls of a building to inspect the walls. In these situations, the movable object needs the precise control and accurate location information.

In some examples, movable object 310 may use the absolute position of the base station 320 and the calculated position of the movable object 310 (determined by RTK) to calculate a vector 330 describing the location of the movable object 310.

Figure 4:
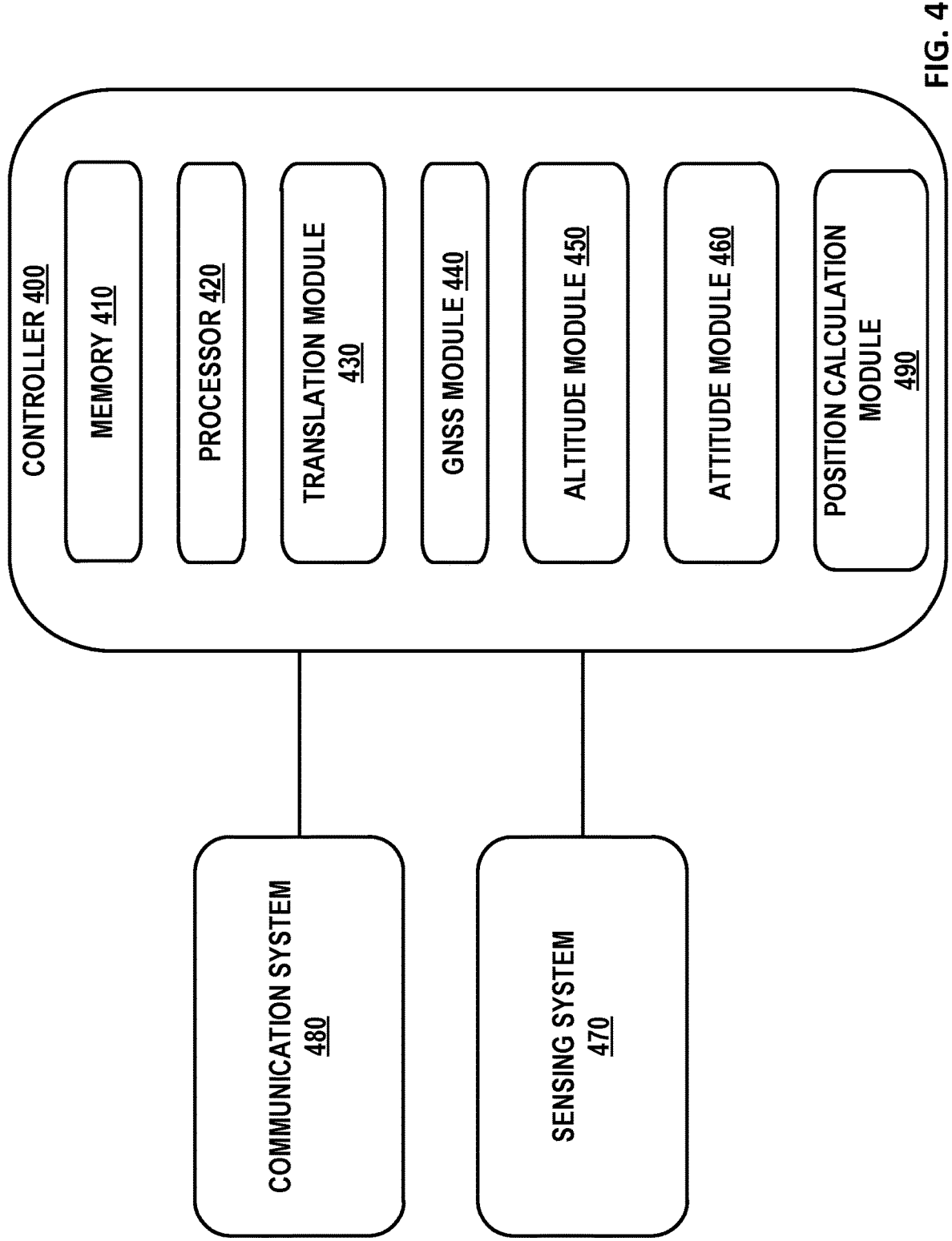
FIG. 4 illustrates a controller that may be used with embodiments of the present disclosure.

FIG. 4 illustrates a controller 400 that may be used with embodiments of the present disclosure. Controller 400 may be included in movable object 100, as shown in FIG. 1. As shown in FIG. 4, controller 400 may include one or more components, for example, a memory 410, at least one processor 420, a translation module 430, a GNSS module 440, altitude module 450, an attitude module 460, and a position calculation module 490.

Memory 410 may be or include non-transitory computer-readable medium and can include one or more memory units of non-transitory computer-readable medium. Non-transitory computer-readable medium of memory 410 may be or include any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Memory units may include permanent and/or removable portions of non-transitory computer-readable medium (e.g., removable media or external storage, such as an SD card, RAM, etc.). Memory 410 may be removable from controller 400.

Memory 410 may store data acquired from sensing system 470. Memory 410 may also be configured to store logic, code and/or program instructions executable by processor 420 to perform any suitable embodiment of the methods described herein. For example, memory 410 may be configured to store computer-readable instructions that, when executed by processor 420, cause the processor to perform a method comprising one or more steps. The method performed by the processor based on the instructions stored in memory 410 may involve processing data (e.g., stored in memory 410, received from terminal 200, received from sensing system 470 (e.g., received directly from sensing system or retrieved from memory), and/or received via communication device 480. In some embodiments, sensing system 470 may be the same as sensing system 125 in FIG. 1. In some embodiments, communication device 480 may be the same as communication system 135 in FIG. 1. In some embodiments, memory 410 can be used to store the processing results produced by the processor 420.

Processor 420 may include one or more processor devices and may execute computer-executable instructions stored in software in memory 410. Processor 420 may be a real or a virtual processor device. In a multi-processing system, multiple processing units execute computer-executable instructions to increase processing power. Processor 420 may include or more processors and may embody a programmable processor (e.g., a central processing unit (CPU)). Processor 420 may be operatively coupled to memory 410 or another memory device.

In some embodiments, processor 420 may include and/or alternatively be operatively coupled to one or more control modules, such as a translation module 430, GNSS module 440, altitude module 450, and attitude module 460.

Processor 420 can be operatively coupled to communication device 480 and be configured to transmit data to and/or receive data from one or more external devices (e.g., terminal 200 or other remote controller). For example, communication system 480 can utilize one or more of local area networks (LAN), wide area networks (WAN), infrared, radio, Wi-Fi, point-to-point (P2P) networks, cellular networks, cloud communication, and the like. Optionally, relay stations, such as towers, satellites, or mobile stations, can be used. Wireless communications can be proximity dependent or proximity independent. In some embodiments, line-of-sight may or may not be required for communications.

The components of controller 400 can be arranged in any suitable configuration. For example, controller 400 may be distributed in different portions of movable object 100 (e.g., main body 110, carrier 120, payload 115, terminal 140, sensing system 125, or an additional external device in communication with one or more of the above). In some embodiments, one or more processors or memory devices can be in different portions of movable object 100.

Translation module 430 may be configured to translate information, such as inputs, command, and other signals, from one perspective (e.g., a perspective of the user, a perspective of a movable object, a perspective of a two-dimensional map or image, etc.) to another perspective (e.g., another of the perspective of the user, a movable object, or another perspective). Translation module 430 may perform the translation between two perspectives through matrix transformation, e.g., by constructing a matrix representation of the user input (i.e., in terms of the user coordinate system) and transforming the matrix into a command matrix representation of the user input (i.e., in terms of the local coordinate system) based on the offset between the user's perspective and the perspective of the movable object. Translation may be accomplished as described in PCT Application No. PCT/CN2016/074824, which is hereby incorporated by reference in its entirety.

Controller 400 may be configured to control the propulsion devices of a movable object to adjust the spatial disposition, velocity, and/or acceleration of the movable object with respect to six degrees of freedom (e.g., up/down, forward/backward, left/right, yaw, roll, and pitch). In some embodiments, controller 400 may be configured to identify a waypoint and control the propulsion system to maintain the movable object in a fixed position relative to the waypoint and/or to navigate with respect to the waypoint.

In some embodiments, the movable object may include a camera or video equipment as a payload. Images acquired from the payload (e.g., through sensing system 470) may be transmitted using communication device 480 to a terminal where a user may select a point or points in the images (e.g., a point in the image where the user desires the movable object to move to). In some examples, the terminal may analyze the image and determine coordinates for the selected point or points. The coordinates may be two-dimensional (e.g., Cartesian, polar, or other coordinate system, defining the location of the point or points on the two-dimensional image). Data defining the coordinates may be received by communication device 480 and sent to controller 400 for further processing. In other embodiments, controller 400 may transmit data defining a local coordinate system to the terminal using communication device 480. The local coordinate system may be used by the terminal to translate two-dimensional coordinates of the selected point or points into three-dimensional coordinates relative to the movable object.

Consistent with embodiments of the present disclosure, GNSS module 440 may be configured to determine a location of the movable object using satellite tracking technology (e.g., RTK, GPS, GLONASS, Galileo, and/or BeiDou), as is known in the art.

Altitude module 450 may be configured to determine the altitude of the movable object. Altitude module 450 may interact with a sensor to determine altitude. The sensor may be interfaced to controller 400 through sensing system 470. For example, altitude may be determined from the GNSS system, a barometer, a laser range finder, etc. In some embodiments, the altitude of the movable object may be determined when the movable object observes its surroundings, for example by taking an image from a camera.

Attitude module 460 may be configured determine the attitude of the movable object and/or the payload, for example, relative to the ground or some other surface. In some embodiments, the attitude of the movable object may be determined using a sensor, such as an accelerometer, a gyro, or the like. The sensor may be interfaced to controller 400 through sensing system 470. The attitude of the movable object may be used to determine how level the movable object and/or payload is compared to the surface. For example, a pitch, yaw, and roll of the movable object may be determined. In some embodiments, attitude module 460 may determine the attitude of the movable object when the movable object observes its surroundings, such as when movable object takes an image of the ground or another surface. For example, the attitude may be determined relative to the surface that camera is taking a picture of.

Position calculation module 490 may be configured to determine the absolute position of the movable object. In some embodiments, position calculation module 490 may determine the position of the movable object using RTK. In some embodiments, position calculation module 490 may also be configured to determine the position of the movable object relative to the coordinates of a selected point in the observed surroundings of the movable object. For example, as will be described below, the movable object may determine the three-dimensional coordinates of a selected point from the observed surroundings of the movable object (e.g., the two-dimensional coordinates of a selected point on an image taken by the movable object). Translation module 430 may translate the two-dimension coordinates to three-dimensional coordinates, for example, shown in FIGS. 7 and 8. In some embodiments, the three-dimensional coordinates of the selected point (e.g., spatial coordinates relative to the movable object) may be determined by a terminal from two-dimensional coordinates (e.g., coordinates on an image displayed by the terminal) and be received from a terminal. Position calculation module 490 may then calculate a vector from the current position of the movable object to the selected point. In practice, translation module 430 and position calculation module 490 may be separate modules or combined into a single module.

Position calculation module 490 may be further configured to determine the absolute position of the selected point relative to a base station. For example, position calculation module 490 may determine a vector representing the position of the movable object relative to a base station. Position calculation module 490 may use vector math to, for example, add the vector from the base station to the movable object with the vector from the movable object to the selected point. The resultant vector may represent the position of the selected point relative to the base station.

Translation module 430, GNSS model 440, altitude module 450, attitude module 460, and position calculation module 490 may be implemented in software for execution on processor 320, or may be implemented in hardware and/or software components separate from processor 320.

Figure 5:
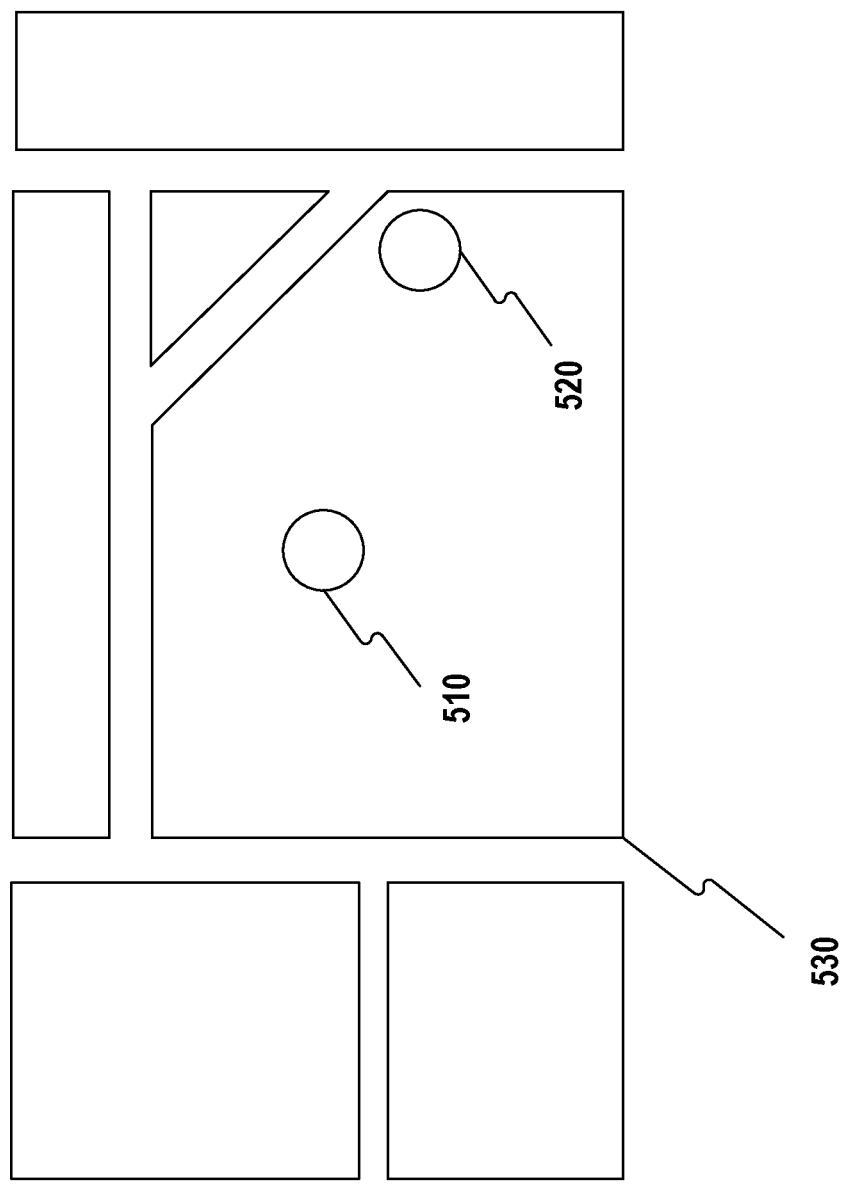
FIG. 5 illustrates an exemplary display showing an image, consistent with the present disclosure.

FIG. 5 illustrates an exemplary display 500 showing image 530, consistent with the present disclosure. Image 530 may be an observation of the surroundings of the movable object. Image 530 may be taken by a camera mounted on a movable object. If the movable object is a UAV, image 530 may be taken while the UAV is flying at a known altitude and known attitude relative to the surface in the image (e.g., the image is an overhead view of the ground) and transmitted to a terminal for display. For example, the UAV may hover at a certain height and take an image of the ground, while also determining its altitude and attitude (e.g., pitch, roll, and yaw) with respect to the ground. The image may be transmitted to the terminal for displaying to a user. In some embodiments, positional information, such as altitude and attitude of the movable object, may be transmitted to the terminal. In some embodiments, a user may select a point on the displayed image, for example, to designate a waypoint.

Figure 7:
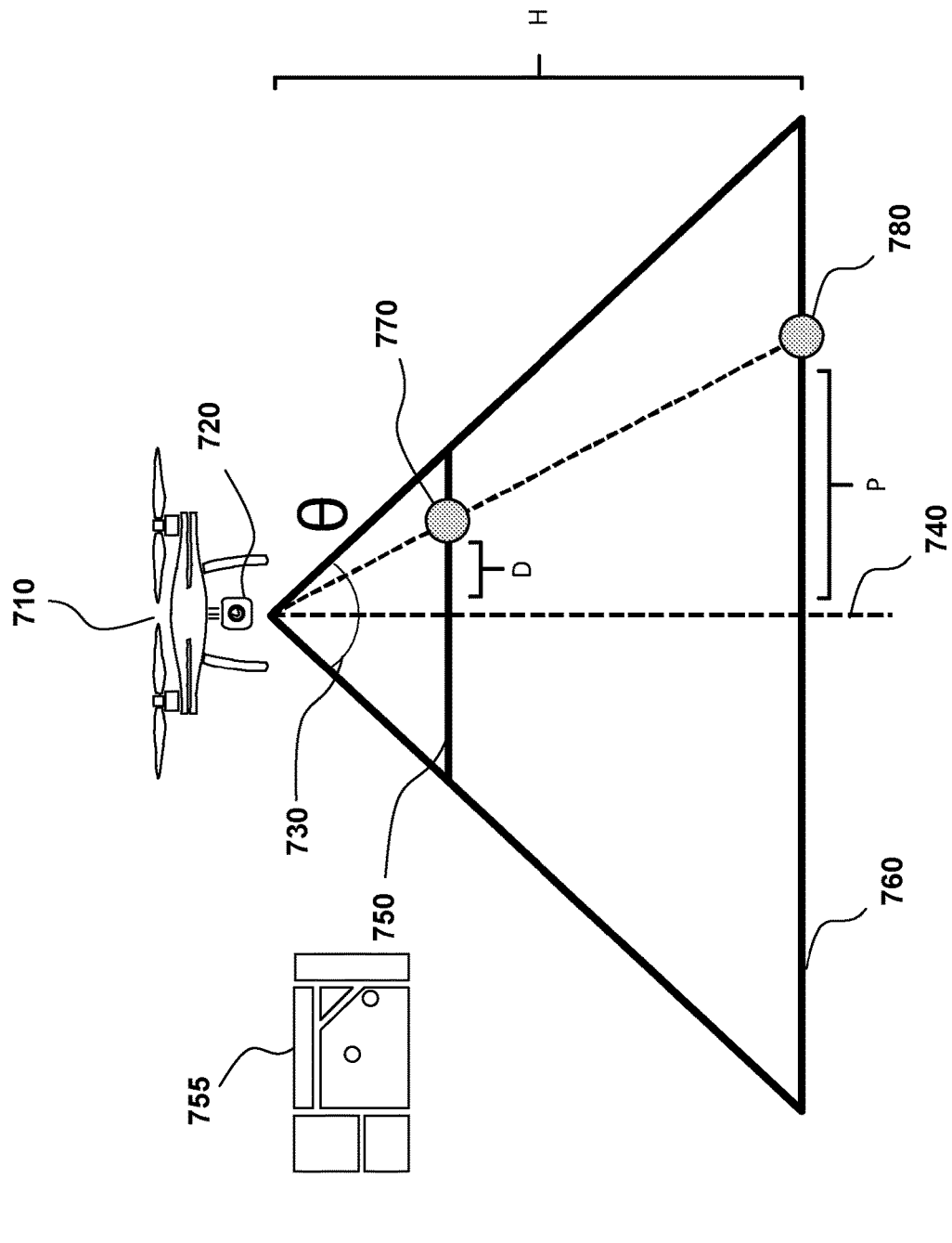
FIG. 7 illustrates an exemplary environment for determining a location on an image, consistent with the disclosed embodiments.
Figure 8:
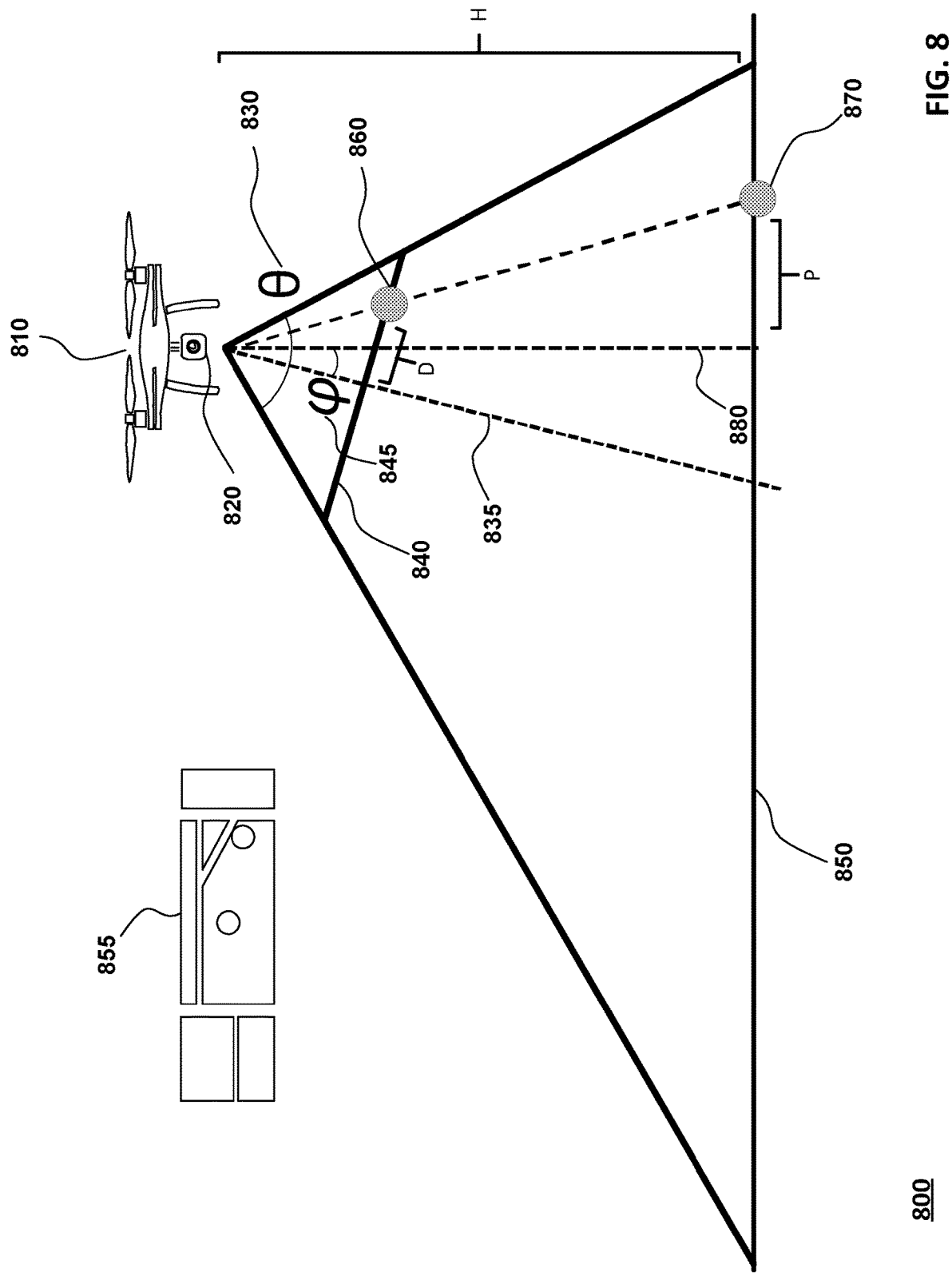
FIG. 8 illustrates an exemplary environment for determining location on a skewed image, consistent with the disclosed embodiments.

Image 530 may include a representation 510 indicating the two-dimensional position of a movable object. Representation 510 may be a cursor of any shape, a dot, or other identifier or icon on the image 530. The movable object may determine its position based on the field-of-view ("FOV") of the camera, the altitude of the movable object, and the attitude of the movable object and/or camera (e.g., the movable object's position may be at the center of the image if no attitude adjustment is required). In other examples, the moveable object may transmit its altitude and attitude (and optionally the FOV of the camera) to the terminal, and the terminal may calculate the position of the movable object on image 530. In some embodiments, the position of the movable object may be the center of the optical axis of the image, as shown in FIGS. 7 and 8 and described below.

In some examples, a user may select and designate a point 520 on image 530 as a waypoint. In other examples, image recognition algorithms may analyze the image and select a point on image 530 based on criteria defined by the user. For example, a user may wish to select a specific building shown in the image. The user may select the building manually, or alternatively, input an address, for example, and the terminal, using the image recognition algorithm, may determine where in the image the address is, and select the building at that address. Any image recognition algorithm known in the art may be used, for example, algorithms used by mapping programs may be used.

The terminal may determine the two-dimensional position of the selected point. In some embodiments, the coordinates may be determined relative to the position of the movable object 510. For example, a distance in pixels may be determined from movable object 510 to selected point 520.

The distance may be in Cartesian coordinates, polar coordinates, or some other coordinate system.

Figure 6:
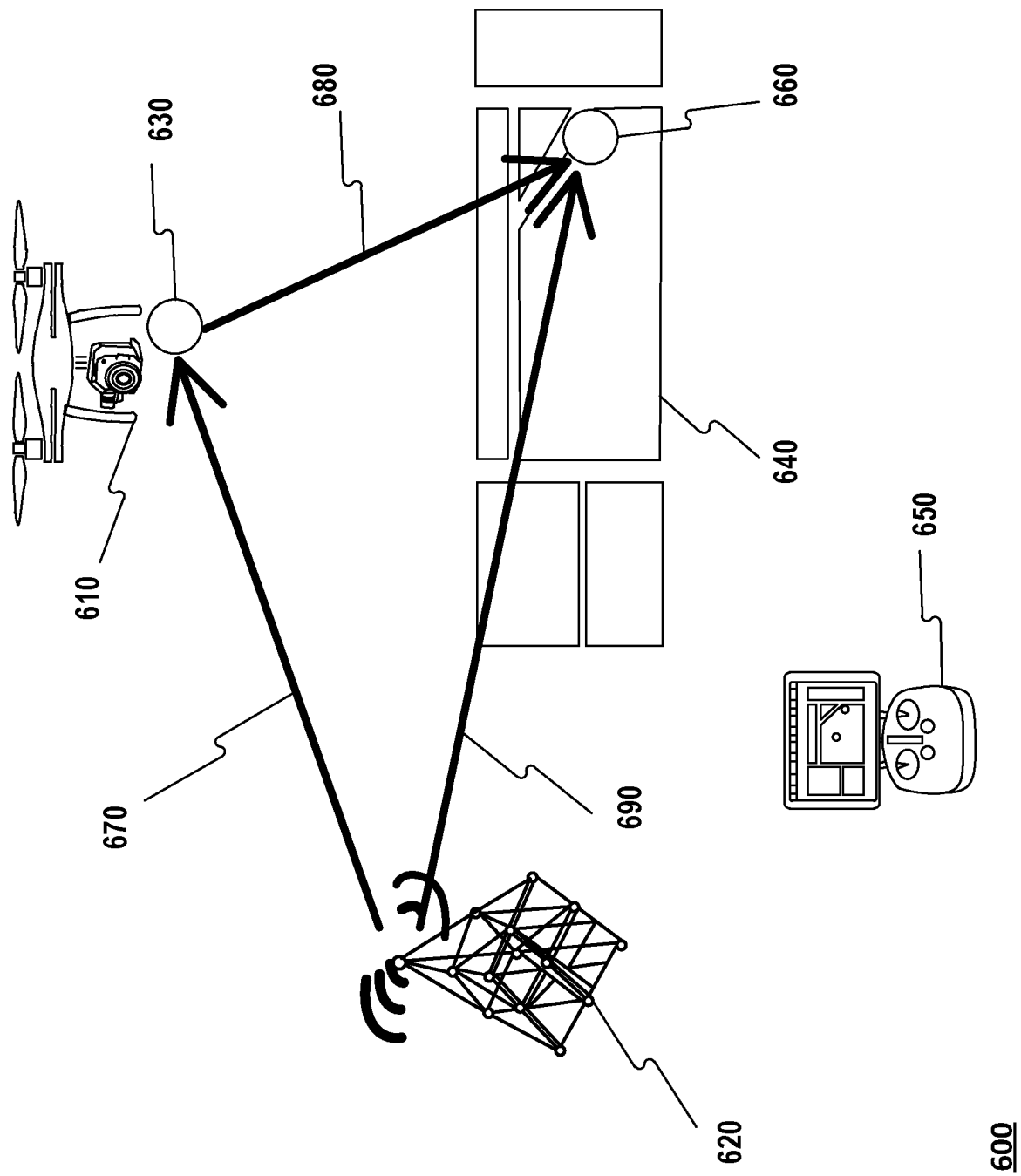
FIG. 6 illustrates an exemplary system for determining a location, consistent with the disclosed embodiments.

FIG. 6 illustrates an exemplary system 600 for determining the location of a selected waypoint 660 consistent with the present disclosure. System 600 includes a movable object 610 with an imaging device with a field of view, a base station 620, and a terminal 650. In the example, a user may have selected and designated point 660 as a waypoint. In some embodiments, movable object 610 and base station 620 both include GNSS modules for determining their respective positions.

As shown in FIG. 6, movable object 610 may be at position 630 (e.g., corresponding to position 510 in FIG. 5). Point 660, which corresponds to position 520 in FIG. 5, may be selected on an image 640 by a user using terminal 650. In some embodiments, relative position 670 from base station 620 to movable object 610 may be determined by RTK and may be expressed as a vector. Relative position 680 from movable object 610 to the three-dimensional position of point 660 may be determined by calculating the spatial position of point 660 based on positional information of movable object 610 and expressed as a vector.

Relative position 690 from base station 620 to point 660 may then be determined by summing the two vectors representing relative position 670 and relative position 680. Relative position 690 thus gives the absolute position of point 660 in three-dimensional space relative to base station 620. In practice, movable object 610 may then navigate to the three-dimensional position indicated by vector 690. By using position 630 of movable object 610 and the three-dimensional position of point 660 to determine relative position 690 indirectly, movable object 610 may calculate the precise position of waypoints more quickly and navigate more precisely to waypoints.

FIG. 7 illustrates an exemplary environment 700 for determining a location from an image 750, consistent with the disclosed embodiments. As shown in the figure, a camera 720 may be mounted on a movable object 710. In some examples, camera 720 may be some other sensor to observe the surroundings of movable object 710.

Camera 720 may have an FOV 730, represented by angle θ, that indicates how wide of an angle an image may cover. Movable object 710 may use camera 720 to take an image 750 of a surrounding 760. In some embodiments, camera 720 may be mounted on a carrier (e.g., carrier 120) that can angle the camera relative to movable object 710. In some examples, the carrier may position the camera such that an optical axis 740 is in the center of image 750 and perpendicular to surrounding 760 (e.g., no attitude adjustment). Surrounding 760 may be the ground, some other surface (e.g., a wall or other vertical surface), or any observable area around movable object 710. Image 750 may have a specified image sensor size in number of pixels, R, that determines the resolution of the image (e.g., 720×480, 1280×720, 1920×1080, etc.). It is noted that the figure shows a cross-section of the image 750 in one dimension with inset 755 showing the image 750 in two dimensions.

In some embodiments, image 750 may be displayed to a user on a terminal, as described above. The user may select a point 770 on image 750. Thus, the two-dimensional coordinates of point 770 may be translated to three-dimensional coordinates of a point 780 in space as follows (FIG. 7 assumes that the attitude of movable object 710 is such that image 750 is parallel to surrounding 760).

In each dimension of image 750, a distance D from optical axis 740 may be determined in number of pixels. Each pixel may have a size dependent on the resolution of the image (e.g., a pixel may indicate a certain number of centimeters). The altitude H of the movable object 710 may be determined as described above (e.g., with an altitude module). Thus, the distance P of point 780 in space from optical axis 740 may be calculated in each dimension (e.g., $P_x$) as:

$$P = \frac{2HD\tan(\theta/2)}{R}.$$

P may be determined, for example, in two dimensions using Cartesian coordinates x and y, to yield $P_x$ and $P_y$. $P_z$ may be determined by the user, set at an arbitrary value, or set to the altitude of movable object 710, etc. Thus, the three-dimensional coordinates of point 780 in space may be calculated from image 750 relative to the known position of movable object 710.

In some examples, the coordinates of point 780 in space may be determined in movable object 710. For example, distances $D_x$ and $D_y$ may be transmitted from the terminal to movable object 710 so that movable object 710 may calculate the coordinates of point 780 in space. In other examples, movable object 710 may transmit altitude H and FOV 730 to the terminal, where the terminal may calculate the coordinates of point 780 in space.

In some embodiments, movable object 710 may take a plurality of two-dimensional images while navigating. In some examples, the images may be sent to the terminal along with positional information (e.g., altitude, attitude, location, etc.) of movable object 710 at the time each image was taken. The terminal may aggregate the images and reconstruct a three-dimensional image from the multiple two-dimensional images. The three-dimensional image may be displayed to the user, and the user may select a point in the three-dimensional space. In this case, the x and y coordinates may be calculated as above, and the z coordinate may be determined by the user from the image.

FIG. 8 illustrates an exemplary environment 800 for determining a location on a skewed image, consistent with the disclosed embodiments. A camera 820 may be mounted on movable object 810. In the example, camera 820 and/or movable object 810 may be skewed with respect to surrounding 850, i.e., not parallel to surrounding 850.

In the example, camera 820 has a FOV 830, θ, to take an image 840. Because the camera 820 may be skewed, its optical axis 835 may be at an orientation or tilt angle 845, φ, with respect to perpendicular axis 880. Orientation angle 845 may be determined by an attitude module in movable object 810, as described above. As described for FIG. 7, a user may select a point 860 on image 840, which has a sensor image size of R. Again, it is noted that the figure shows a cross-section of the image 840 in one dimension with inset 855 showing the image 840 in two dimensions. The two-dimensional coordinates of point 860 on image 840 may be translated into three-dimensional coordinates for a point 870 in space. In each dimension of image 840, a distance D from optical axis 835 may be determined in number of pixels. The altitude H of movable object 810 may be determined as described above (e.g., with altitude module). Thus, the distance P of point 870 in space from a perpendicular axis 880 may be calculated in each dimension as:

$$P = \frac{H\left(\frac{2D\tan(\theta/2)}{R} - \tan\varphi\right)}{\frac{(1 + 2D\tan(\theta/2)\tan\varphi)}{R}}$$

P may be determined, for example, in two dimensions using Cartesian coordinates x and y, to yield $P_x$ and $P_y$. $P_z$ may be determined by the user, set at an arbitrary value, set to the altitude of the movable object, etc. Thus, the three-dimensional coordinates of point 870 in space may be calculated from image 840 relative to movable object 810.

Figure 9:
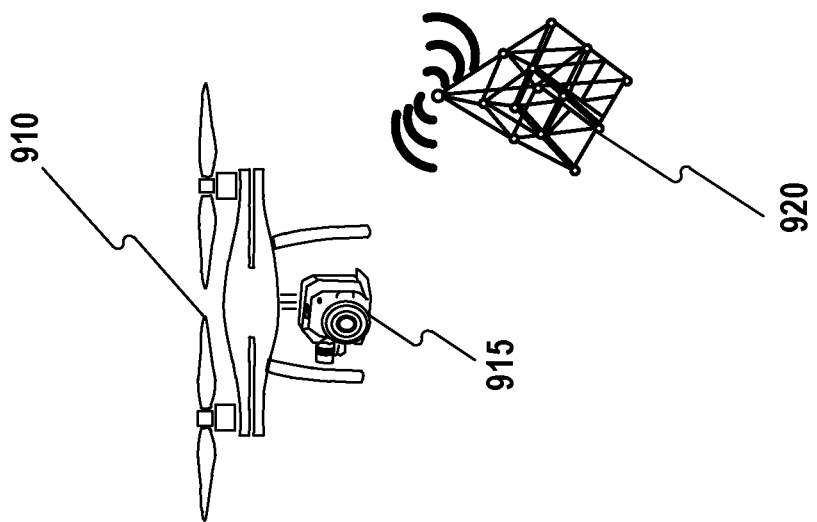
FIG. 9 illustrates an exemplary environment for determining waypoints on a vertical surface, consistent with the disclosed embodiments.
Figure 9:
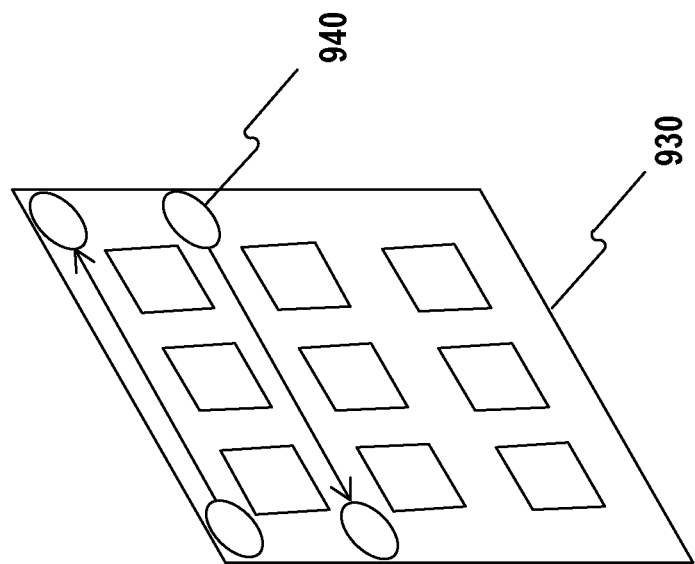

FIG. 9 illustrates an exemplary environment 900 for determining waypoints 940 on a vertical surface, consistent with the disclosed embodiments. As shown in FIG. 9, a camera 915 may be mounted on movable object 910, which may be in communication with a base station 920 such that movable object 910 can precisely determine (e.g., to centimeter accuracy) its absolute position using RTK. Movable object 910 may move along a vertical surface 930 (e.g., a building, a wall, etc.) and take one or more images of vertical surface 930. Movable object 910 may transmit the one or more images to a terminal. In some examples, movable object may also transmit positional information to the terminal. A user may select a point on the image of the vertical surface 930. Waypoints 940 may be determined from the selected point as described above for FIGS. 7 and 8 (dependent on the attitude of the camera 915 to the vertical surface 930). However, instead of using altitude, H may represent a horizontal distance from movable object 910 to vertical surface 930. For example, moveable object 910 may be equipped with a laser range finder to determine the distance from movable object 910 to vertical surface 930.

Figure 10:
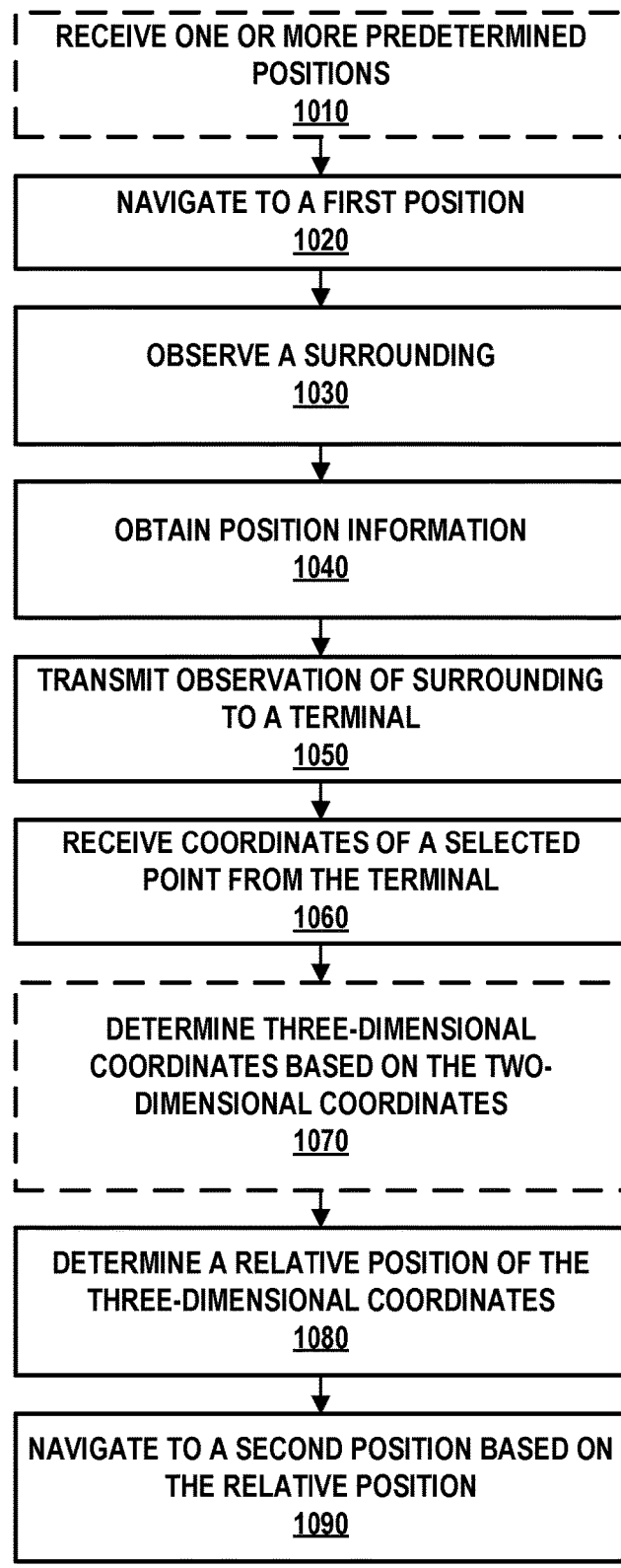
FIG. 10 is a flowchart illustrating an exemplary method of navigating from a first position to a second position, consistent with the disclosed embodiments.

FIG. 10 is a flowchart illustrating an exemplary method of a movable object navigating from a first position to a second position, consistent with the disclosed embodiments, that can be implemented, for example, in system 100 shown in FIG. 1. The technologies described herein can be used with different operating systems or hardware and applied in any variety of environments to take advantage of the described features.

At optional step 1010, the moveable object may receive one or more predetermined positions. For example, a user may select waypoints from a low-resolution map on a terminal and transmit the waypoints to the movable object. The low resolution map may be an image with a resolution lower than the resolution of a camera that may be equipped by the movable object. Alternatively, the one or more predetermined positions may be preprogrammed, standard positions. For example, the movable object may receive a predetermined altitude to hover at.

At step 1020, the movable object may navigate to a first position. The first position may be one of the received predetermined positions. Alternatively, a user may use a terminal to identify the first position and control the movable object to move to the first position.

At step 1030, the movable object may observe a surrounding. In some embodiments, the movable object may include a camera and observe surroundings by taking an image with the camera facing a specified direction (e.g., of the ground or other object. In some embodiments, the observation of the surrounding may include the one or more predetermined positions. For example, if the predetermined positions were selected from a low-resolution map, the movable object may navigate to a first position and take an image that includes those map coordinates.

At step 1040, the movable object may obtain position information. In some embodiments, the movable object may determine its absolute position in space using RTK. The movable object may also determine its altitude and/or distance from the observed surrounding, for example, using GNSS, a barometer, a laser range finder, etc., and its attitude (e.g., roll, pitch, and yaw) relative to the observed surrounding, for example using a gyro, accelerometer, etc. Alternatively, the attitude of the camera may be determined, if it is not in a fixed position relative to the movable object. For example, if the camera is angled such that it is not parallel to the surface of the object it is imagining, the camera's attitude with respect to the surface can be determined.

At step 1050, the movable object may transmit the observation of the surrounding (e.g., image) to a terminal (e.g., remote device or remote control). In addition to the image, the movable object may also transmit the position information to the terminal. For example, the movable object may transmit an image of the ground or an image of the side of a building to the terminal along with its absolute position, altitude, and attitude. In some embodiments, the terminal may be configured to display the image to a user and receive a selection by the user of a point on the image. The terminal may be further configured to determine the coordinates of the selected point on the image and transmit the coordinates to the movable object.

At step 1060, the movable object may receive the coordinates of the selected point from the terminal. The coordinates may be two-dimensional coordinates, or the terminal may use the optionally received position information and calculate three-dimensional coordinates of the selected point.

At optional step 1070, the movable object may determine the three-dimensional coordinates of the selected point based on received two-dimensional coordinates. As described above, the movable object may use the position information to determine the three-dimensional coordinates.

At step 1080, the movable object may determine the position of the three-dimensional coordinates relative to a base station. As described above, the movable object may determine a first vector from the base station to the first position using RTK and a second vector from the first position to the three-dimensional coordinates. The position of the three-dimensional coordinates relative to the base station can be calculated as the resultant first and second vectors. Using the resultant vector a second position (e.g., the absolute position of the waypoint) can be determined.

At step 1090, the movable object may navigate to the second position from the first position. The movable object may update the second position as it navigates. For example, the movable object may use RTK to determine its current position and then use vector math to determine the second position. This process of determining the second position greatly reduces the calculations necessary to determine the second position because RTK is used only to determine the current position of the movable object.

Figure 11:
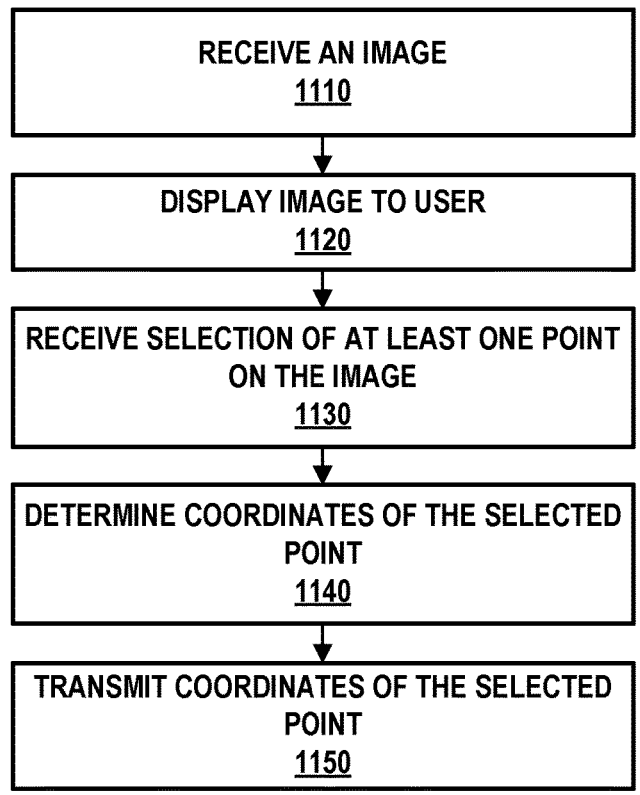
FIG. 11 is a flowchart illustrating an exemplary method of determining a waypoint, consistent with the disclosed embodiments.

FIG. 11 is a flowchart illustrating an exemplary method of determining a waypoint, consistent with the disclosed embodiments, which can be implemented, for example, on a terminal as shown in FIG. 2.

At step 1110, the terminal (e.g., remote device) may receive an image from a movable object. For example, the image may be received from a UAV flying overhead and taking a picture of the ground with a camera. In some embodiments, the terminal may also receive positional information from the movable object.

At step 1120, the terminal may display the received image to a user using a display screen for displaying information to the user. The terminal may display the image to the user on the display screen and allow the user to select a point on the image. In some examples, the position of the movable object may also be displayed on the image.

At step 1130, the terminal may receive a selection of at least one point on the image. In some embodiments, a user may select the at least one point directly on the image and designated a waypoint for the movable object to navigate to. In some embodiments, the terminal may automatically select at least one point based on information input by the user. For example, the terminal may accept input from the user, other than selecting a point on the image, such as an address of a building or location into the terminal. The terminal may analyze the image and determine a point on the image matching the address. The terminal may designate the point as a waypoint.

At step 1140, the terminal may determine coordinates of the at least one point selected on the image. In some embodiments, the coordinates may be two-dimensional coordinates and determined as described above. If the terminal received the positional information from the movable object, it may instead calculate three-dimensional coordinates of the point relative to the movable object, as described above.

At step 1150, the terminal may transmit the determined coordinates to the movable object.

Figure 12:
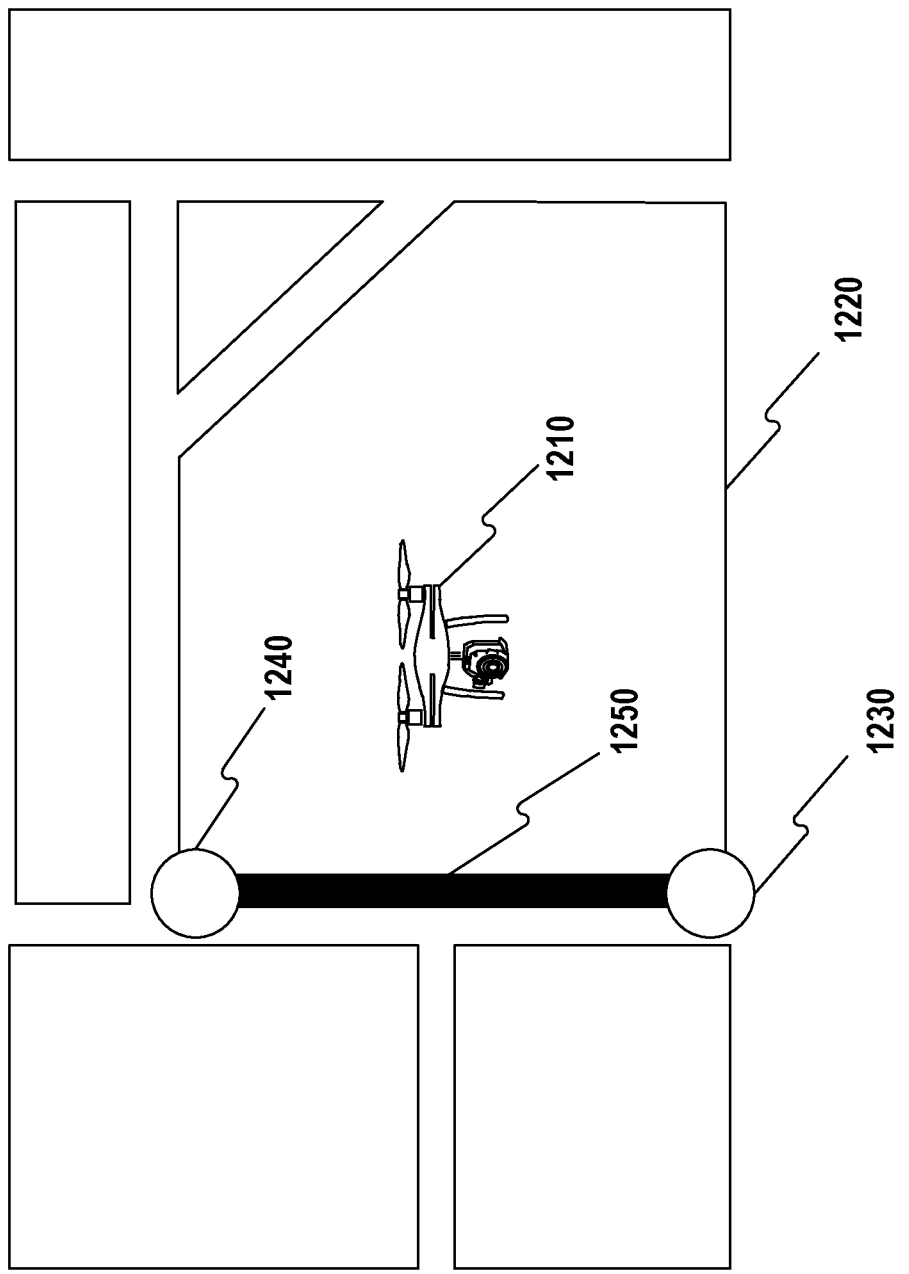
FIG. 12 illustrates an exemplary system of forming a virtual wall, consistent with the disclosed embodiments.

FIG. 12 illustrates an exemplary system 1200 of forming a virtual wall, consistent with the disclosed embodiments. As shown in FIG. 12, a movable object 1210 may navigate in an area 1220. The movable object 1210 may observe its surroundings (e.g., take an image of the ground or some other surface, such as a wall or side of building) and send the observation (e.g., image) to a terminal (not shown). The terminal may display the image and receive a selection of at least two points 1230 and 1240 on the image, for example, from a user. As described above, the terminal may determine the coordinates of the selected points on the image and transmit the coordinates to the movable object 1210.

In some embodiments, a user may designate a line on the image (e.g., draw a line between two points) or draw an enclosed area on the image (not shown). The terminal may determine continuous coordinates of the line by, for example, subdividing the line into straight segments, each of which are between two points. The terminal may then determine the coordinates of each point. The terminal may transmit the coordinates of the points to the movable object 1210.

As described above, the movable object 1210 may determine or receive the three-dimensional coordinates of the received points. The absolute position of the received points may be determined by vector math as described above.

In some embodiments, the movable object may form a virtual wall 1250 by connecting all of the selected points such that the movable object 1210 may not pass between the points. In other words, the points may define a "no-enter" or "no-fly" zone.

In some embodiments, the height of the virtual wall 1250 may be adjusted by the user. For example, the virtual wall 1250 may start at a user adjustable height and extend upward. In other examples, the virtual wall 1250 may extend from the ground and stop at a user adjustable height. In still other examples, the virtual wall 1250 may extend from the ground upward.

Disclosed embodiments may implement computer-executable instructions, such as those included in program modules and executed in a computing environment on a target real or virtual processor device. Program modules may include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed a processing unit, as described above.

Various operations or functions of the example embodiments can be implemented as software code or instructions. Such content can be directly executable ("object" or "executable" form), source code, or difference code ("delta" or "patch" code). Software implementations of the embodiments described herein can be provided via an article of manufacture with the code or instructions stored thereon, or via a method of operating a communication interface to send data via the communication interface. A machine or computer-readable storage device can cause a machine to perform the functions or operations described, and includes any mechanism that stores information in a tangible form accessible by a machine (e.g., computing device, electronic system, and the like), such as recordable/non-recordable media (e.g., read only memory (ROM), random access memory (RAM), magnetic disk storage media, optical storage media, flash memory devices, and the like). Computer-readable storage devices store computer-readable instruction in a non-transitory manner and do not include signals per se.

The technologies described herein have many advantages in the field of controlling the movement of movable objects. For example, a user can designate waypoint positions precisely by selecting their position on a high resolution image. The user may change waypoints using current image data and the movable object may quickly and accurately calculate the new waypoint position. In some examples, a movable object may require a precise navigation path, such as when dispersing pesticides on a farm. Using the described systems and methods, the movable object may precisely navigate between waypoints and not scatter pesticides to unwanted areas. The disclosed features are particularly useful when images captured by a movable object are low in contrast and/or generally smooth. In this case, the movable object cannot navigate by using feature recognition in the images. Thus, in some embodiments, the terminal may determine a smoothness or contrast value in the acquired images. If the value is less than a predetermined value, then navigating as described herein may be used. In other embodiments, navigation as described herein may be used regardless of the value.

Aspects of the embodiments and any of the methods described herein can be performed by computer-executable instructions stored in one or more computer-readable media (storage or other tangible media) or stored in one or more compute readable storage devices, as described herein. The computer-executable instructions can be organized into one or more computer-executable components or modules. Aspects of the embodiments can be implemented with any number and organization of such components or modules. For example, aspects of the disclosed embodiments are not limited to the specific computer-executable instructions or the specific components or modules illustrated in the figures and described herein. Other embodiments may include different computer-executable instructions or components having more or less functionality than illustrated and described herein.

The order of execution or performance of the operations in the disclosed embodiments illustrated and described herein is not essential, unless otherwise specified. That is, the operations can be performed in any order, unless otherwise specified, and embodiments can include additional or fewer operations than those disclosed herein. For example, it is contemplated that executing or performing a particular operation before, contemporaneously with, or after another operation is within the scope of aspects of the disclosed embodiments.

Having described the disclosed embodiments in detail, it will be apparent that modifications and variations are possible without departing from the scope of aspects as defined in the appended claims. For instance, elements of the illustrated embodiments may be implemented in software and/or hardware. In addition, the technologies from any embodiment or example can be combined with the technologies described in any one or more of the other embodiments or examples. In view of the many possible embodiments to which the principles of the disclosed technology may be applied, it should be recognized that the illustrated embodiments are examples of the disclosed technology and should not be taken as a limitation on the scope of the disclosed technology. Therefore, it is intended that all matter contained in the above description and shown in the accompanying drawings shall be interpreted as illustrative and not in a limiting sense.

What is claimed is:

1. A system for navigation, comprising:
   a movable object configured to:
   navigate to a first position; and
      while the movable object being at the first position, perform:
         receiving a selected point on an image;
         determining three-dimensional (3D) coordinates corresponding to the selected point based on a two-dimensional (2D) position of the selected point on the image, an altitude of the movable object, and a field-of-view (FOV) angle associated with the image;
         determining a first relative vector from a base station to the first position;
         determining a second relative vector from the first position to a position represented by the 3D coordinates;
         calculating a resultant vector from the first vector to the second vector; and
         determining a second position based on the resultant vector.

2. The system of claim 1, further comprising a camera attached to the movable object and configured to take the image, the image being an image of a surface.

3. The system of claim 2, wherein the camera is attached to the movable object by a carrier.

4. The system of claim 3, wherein the carrier is a gimbal.

5. The system of claim 1, wherein the image is taken when the movable object flies.

6. The system of claim 1, wherein the first position corresponds to one or more predetermined positions.

7. The system of claim 6, wherein:
   the one or more predetermined positions include two or more predetermined positions; and
   a virtual wall is formed from at least two positions from the two or more predetermined positions.

8. The system of claim 7, wherein the movable object is configured to not cross the virtual wall.

9. The system of claim 6, wherein:
   the image is a first image; and
   the one or more predetermined positions are relative to a map or a second image.

10. The system of claim 1, wherein a position of the movable object is determined by a barometer or a laser.

11. The system of claim 1, wherein the first position is selected from a lower resolution map than the image containing a surrounding observed by the movable object.

12. The method of claim 11, wherein the surrounding comprises the Earth below the movable object.

13. The system of claim 1, further comprising a terminal configured to send and receive data from the movable object.

14. The system of claim 13, wherein the data includes received images, and the terminal is further configured to aggregate the received images and reconstruct the image from the received images.

15. The system of claim 13, wherein the movable object is further configured to send the image to the terminal and receive coordinates from the terminal based on the selected point on the image.

16. The system of claim 15, wherein the terminal is further configured to display the image and receive the selected point on the image.

17. The system of claim 16, wherein the terminal is further configured to translate the coordinates of the selected point on the image to coordinates relative to the movable object.

18. The system of claim 16, wherein the terminal is further configured to translate the coordinates of the selected point on the image to three-dimensional coordinates of a point based on an attitude of the movable object.

19. The system of claim 1, wherein the movable object is configured to navigate from the first position to the second position.

* * * * *